(12) United States Patent
Nowottny et al.

(10) Patent No.: US 8,377,382 B2
(45) Date of Patent: Feb. 19, 2013

(54) RECYCLING FURNACE FOR BURNING OFF PRECIOUS METAL-CONTAINING MATERIALS

(75) Inventors: Christian Nowottny, Nidderau (DE); Horst Meyer, Altenstadt (DE); Matthias Grehl, Goldbach (DE); Dieter Schafer, Münzenberg (DE); Hans-Joachim Alt, Bruchköbel (DE); Wilhelm Glab, Mühleim/Main (DE)

(73) Assignee: Heraeus Precious Metals GmbH & Co. KG, Hanau (DE)

( * ) Notice: Subject to any disclaimer, the term of this patent is extended or adjusted under 35 U.S.C. 154(b) by 0 days.

(21) Appl. No.: 13/461,114

(22) Filed: May 1, 2012

(65) Prior Publication Data

US 2012/0227643 A1    Sep. 13, 2012

Related U.S. Application Data

(60) Division of application No. 12/056,524, filed on Mar. 27, 2008, now Pat. No. 8,188,329, which is a continuation of application No. PCT/EP2006/009267, filed on Sep. 25, 2006.

(30) Foreign Application Priority Data

Sep. 27, 2005 (DE) .......................... 10 2005 046 275

(51) Int. Cl.
*F01N 3/20* (2006.01)
(52) U.S. Cl. ........ 422/105; 422/110; 422/111; 110/185; 110/267; 110/342
(58) Field of Classification Search .................. 422/105, 422/110, 111; 110/185, 267, 342
See application file for complete search history.

(56) References Cited

U.S. PATENT DOCUMENTS 3,404,029 A * 10/1968 Dooley et al. ................. 162/160
3,580,718 A * 5/1971 Rasworschegg et al. ....... 75/550
(Continued)

FOREIGN PATENT DOCUMENTS

DE          3329042 A1    2/1985
DE          3223501 C1    12/1985
(Continued)

OTHER PUBLICATIONS

Arno Hollmann, "Edelmetall-Recycling: Verschwelung statt Verbrennung", WLB Wasser Luft Und Boden, vol. 3, pp. 45-47 (2000).

(Continued)

*Primary Examiner* — Walter D Griffin
*Assistant Examiner* — Huy-Tram Nguyen
(74) *Attorney, Agent, or Firm* — Panitch Schwarze Belisario & Nadel LLP

(57) ABSTRACT

A recycling furnace is provided for processing potentially explosive precious metal-containing materials having organic fractions that combust with great energy. The furnace includes a switching facility for alternating operation of two burning-off chambers of the furnace between: (A) pyrolysis or carbonization under protective furnace gas in an atmosphere comprising maximally 6 wt-% oxygen, and (B) oxidative combustion of the organic fractions including carbon. The furnace has indirect heating and a control that determines the end of the pyrolysis or carbonization by a sensor and controls the switching facility to supply air or oxygen to the interior of the furnace. A continuous conveyor for dosing of liquids or liquefied substances during the pyrolysis is controlled by at least one parameter of post-combustion, preferably a temperature sensor. A single waste gas treatment facility is used for thermal post-combustion for the two furnace chambers.

7 Claims, 1 Drawing Sheet chamber 1 chamber 2

U.S. PATENT DOCUMENTS

| | | | |
|---|---|---|---|
| 3,632,336 A | | 1/1972 | Cameron |
| 4,040,789 A | * | 8/1977 | Voss et al. ............... 436/114 |
| 4,233,496 A | | 11/1980 | Weber et al. |
| 4,360,380 A | | 11/1982 | Zarur |
| 4,412,889 A | | 11/1983 | Oeck |
| 4,557,203 A | * | 12/1985 | Mainord ............... 110/344 |
| 4,656,148 A | * | 4/1987 | Buhler et al. ............. 502/34 |
| 4,687,514 A | | 8/1987 | Renner et al. |
| 5,223,783 A | * | 6/1993 | Wilis ............... 324/71.5 |
| 5,826,520 A | | 10/1998 | Mainord |
| 6,701,855 B2 | * | 3/2004 | Barba ............... 110/342 |
| 6,758,972 B2 | | 7/2004 | Vriens et al. |
| 2003/0221597 A1 | * | 12/2003 | Barba ............... 110/342 |

FOREIGN PATENT DOCUMENTS

| | | |
|---|---|---|
| DE | 3518725 A1 | 11/1986 |
| DE | 3134733 C2 | 1/1990 |
| DE | 9420410 U1 | 2/1995 |
| EP | 1 951 919 A2 | 8/2008 |
| JP | 04225711 A | 8/1992 |
| JP | 2003261880 A | 9/2003 |
| JP | 2005194596 A | 7/2005 |
| WO | 9937823 A1 | 7/1999 |

OTHER PUBLICATIONS

Ullmann's 6th ed., CD-ROM-Release 2003, "Treatment of Waste", Ref. 320: K. J. Thorné-Kozmiensky: Thermische Abfallbehandlung, EF-Verlag für Energie—und Umwelttechnik, Berlin pp. 51-73, (1994).
Brochure: Aquacat®-Process by Johnson Matthey Catalysts.
Office Action from the German Patent Office issued Jun. 20, 2006 in German Patent Application No. 10 2005 046 275.8-24.
Office Action from the Australian Patent Office issued Sep. 2, 2009 in Australian Patent Applcation No. 2006296760 (now Australian Patent No. 2006296760 B2).
Office Action from the Canadian Patent Office issued Jan. 4, 2010 in Canadian Patent Application No. 2,623,699.
Office Action from the Chinese Patent Office issued Sep. 11, 2009 in Chinese Patent Application No. 200680035485.1.
Frist Office Action from the European Patent Office issued Oct. 15, 2008 in European Patent Application No. 06 805 827.0 (now European Patent No. 1 951 919 B1).
Supplemental Office Action from the European Patent Office issued Jan. 4, 2010 in European Patent Application No. 06 805 827.0 (now European Patent No. 1 951 919 B1).
Office Action from the Japanese Patent Office issued Nov. 6, 2009 in Japanese Application No. 2008-532642.
Office Action from the Korean Patent Office issued Jun. 28, 2010 in Korean Patent Application No. 10-2008-7007362.
Office Action from the Russian Patent Office issued Sep. 25, 2006 in Russian Application No. 2008116593.
Int'l Preliminary Report on Patentability from the Int'l Searching Authority issued Apr. 24, 2008 in Int'l Application No. PCT/EP2006/009267.
Office Action from the Repulic of South Africa Patent Office issued Mar. 25, 2008 in South African Patent No. 2008/02623.
U.S. Office Action issued Nov. 29, 2010 in U.S. Appl. No. 12/056,524.
U.S. Office Action issued May 17, 2011 in U.S. Appl. No. 12/056,524.
Int'l Search Report issued Sep. 12, 2007 in Int'l Application No. PCT/EP2006/009267.

* cited by examiner

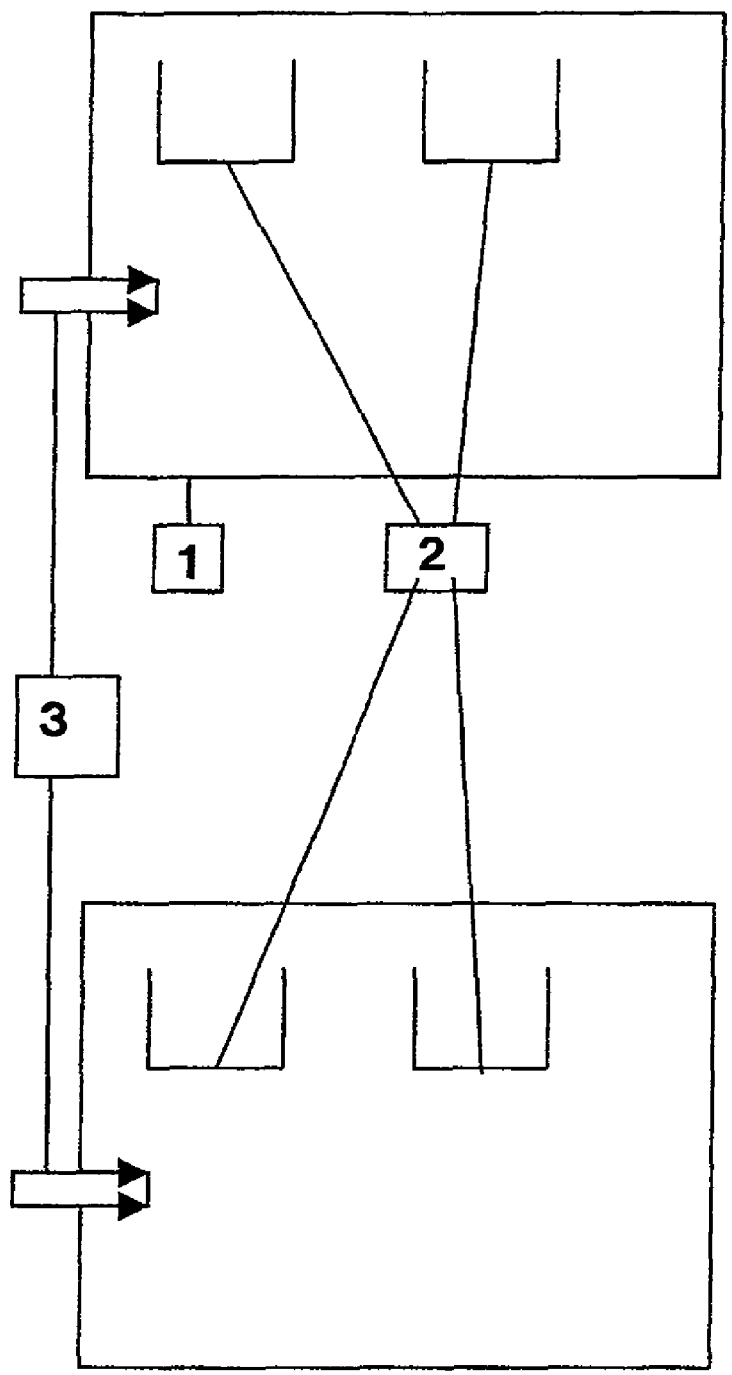

US 8,377,382 B2

RECYCLING FURNACE FOR BURNING OFF PRECIOUS METAL-CONTAINING MATERIALS

CROSS-REFERENCE TO RELATED APPLICATIONS

This application is a Divisional of U.S. patent application Ser. No. 12/056,524, filed Mar. 27, 2008, now U.S. Pat. No. 8,188,329, which was a Continuation of International Application No. PCT/EP2006/009267, filed Sep. 25, 2006, which was published in the German language on Apr. 5, 2007, under International Publication No. WO 2007/036334 A2 and the disclosure of which is incorporated herein by reference.

BACKGROUND OF THE INVENTION

The invention relates to a method and corresponding device for burning-off precious metal-containing materials.

The following methods are customary on an industrial scale for the processing of precious metal-containing waste materials with relatively high organic fractions, such as catalyst residues, printed circuit boards and other electronic scrap:

1. Ecolyst® method (Umicore), described in German Patent DE 32 23 501C1/C2. This is a method for precipitation of, mainly, Rh from liquid organic residues through the use of tellurium. An organic mixture remains after separation of the precious metal and must be disposed of (e.g., by combustion). The method requires continuously transportable material.
2. Aquacat® method (Johnson Matthey). This method can be used to process waste materials that contain carbon and organic compounds and precious metals, in particular gold, silver, platinum, and palladium waste from industrial production and the watch and jewelry industry. The organic components are oxidized with oxygen in supercritical water under pressure, with the precious metal remaining behind as an oxidic residue. As before, the material must be continuously transportable. In addition, the method requires a pressurized reactor.

The aim is for an improved method possessing the following advantageous features:

1) Batch-wise or continuous processing with the option of continuous operation;
2) Efficient control of the thermal economy; and
3) High yield of the valuable substances.

The direct combustion (burning-off) of the organic fractions of precious metal-containing residues is already being utilized in various methods. Methods for the combustion of precious metal-containing sludges and multi-element waste with subsequent leaching of the ash are described, for example, in German Patent DE 31 34 733 C2 and International Patent Application Publication WO 99/37823. However, if the residues to be treated contain organic fractions that combust very easily and with great energy, there may be very intensive flame formation.

Siemens KWU developed a method for the treatment of private household waste, in which pyrolysis and high temperature combustion with utilization of the pyrolysis gases were combined (Ullmann's 6th ed., CD-ROM-Release 2003, "Waste" Ref 320: K. J. Thomé-Kozmiensky: *Thermische Abfallbehandlung*, EF-Verlag für Energie- and Umwelttechnik, Berlin 1994). However, the crucial factor therein is the production of energy during combustion (waste power plant).

Another possible method is the gasification of the organic fractions of metal-containing waste. German published patent application DE 33 29 042 A1 relates to a method for the recycling of non-ferrous heavy metals and precious metals from plastic-containing materials, in particular from coking products, in which the carbon is gasified under isothermal conditions with a separately generated gasification agent, such as $H_2O/CO_2/O_2$, whereby the temperature is regulated by the partial pressures. However, this method also is associated with major equipment needs and the presence of significant fractions amenable to gasification at all times, since the gas ultimately serves to produce energy.

German Utility Model DE 94 20 410 U1 relates to a facility for a thermal recycling method for metallic objects that are mixed with or contaminated by organic substances, e.g., oil barrels, but also, on a smaller scale, precious metal-containing sweepings from jewelry workshops or small operations of the jewelry industry. Carbonization in the presence of a pyrolysis phase and an oxidation phase in a carbonization chamber is recommended in this context, whereby the oxidation proceeds with the introduction of a waste gas with a combustible oxygen content. According to German published patent application DE 35 18 725 A1, a similar facility serves for thermal varnish removal—in this case, including the combustion of the carbonization gases.

The two methods are not suitable for liquids with organic fractions that combust with great energy.

BRIEF SUMMARY OF THE INVENTION

Surprisingly, a simple process procedure allows both reduction of the major plant resource need and realization of the improvement features mentioned above.

The invention relates to the burning-off of precious metal-containing materials with organic fractions that combust with great energy, in at least two steps of which the first (A) includes a pyrolysis or carbonization at reduced oxygen supply, and at least one additional step (B) comprises an oxidative combustion. A hot flame is not generated during the first process step. In the subsequent oxidative combustion of the pyrolysis residue, the flame and the emission of soot are limited. Preferably, soot emission is excluded.

The precious metal-containing materials with organic fractions are, in particular, coals, solvents or plastic materials. Such materials generally have a calorific value of 20 to 50 KJ/g, in particular about 40 KJ/g, and are potentially explosive, if applicable. According to the invention, steps A and B are carried out sequentially in a furnace chamber of an indirectly heated furnace. In this context, the pyrolysis, in German also termed carbonization, proceeds in an atmosphere with a reduced oxygen content. For this purpose, the chamber is purged with protective furnace gas, preferably nitrogen or argon. The oxygen content is a maximum of 6 wt-%, preferably a maximum of 4 wt-%. The end of the pyrolysis is detected by a sensor, preferably a pressure sensor. At the end of process step A, the pyrolysis-treated material comprises not easily volatized substances with a high carbon content. After the sensor-detected end of the pyrolysis, the atmosphere is changed by supplying air or oxygen, and thus step B is initiated directly. Surprisingly, oxygen can be introduced into the furnace that is already heated to 400 to 900° C., preferably 500 to 800° C., without an explosion occurring. This process step saves substantial logistic resources, substantial energy use, and shortens the time needed.

The energy use can be reduced further by having two furnaces carry out steps A and B in an alternating fashion and by these two furnaces each being equipped with a single waste treatment step. Thus, the waste gases of pyrolysis and the waste gases of combustion reach the waste gas treatment facility concurrently. This reduces the volume flux and therefore the energy needs.

For a recycling furnace according to the invention, it is significant that the burning-off chamber of the furnace be provided with a sensor, in order to be able to detect the end of the pyrolysis. It is also significant that the pyrolysis furnace can be operated both under a protective furnace gas as well as while supplying air or under an oxygen atmosphere, and is provided with a switching facility that can switch from the protective furnace gas filling of the furnace chamber to an air flow and/or oxygen flow. In this context, the switching must be controlled as a function of the result obtained by the sensor.

In terms of the method, it is relevant that steps A and B are carried out sequentially in a chamber, that the end of the pyrolysis is determined, and that a switch of atmospheres from protective furnace gas-containing atmosphere to air or oxygen atmosphere is effected after the end of the pyrolysis. This dispenses with a batch change and the ensuing use of time and energy resources.

In a preferred embodiment, the furnace comprises a continuous conveyor facility for liquids or pastes. For this purpose, during the pyrolysis, liquids or pastes are continuously conveyed into the pyrolysis chamber of the furnace, which is at a temperature of 300° C. to 700° C., preferably 350° C. to 600° C. A risk of explosion is prevented in this context by operating the furnace at a slight over-pressure.

Pastes get heated to the degree that they behave like liquids. By conveying liquid substances or liquefied pastes through a conduit of pipes, oxygen introduction is kept at such low levels that explosion limits cannot be reached.

The precious metal fraction of the waste materials can vary widely depending on its origin, e.g., from 0.01 to 60%. Metals other than precious metals can also be contained therein. Enrichment by the continuous conveying facility in the pyrolysis is particularly suitable for waste materials with a precious metal fraction between 10 and 1000 ppm (0.001 and 0.1 wt-%), preferably between 10 and 100 ppm (0.001 and 0.01 wt-%), since considerable enrichment in a trough can be achieved already during the pyrolysis by the continuous conveyance. The continuous conveyance allows many times the liquid volume, relative to the trough volume, to be pyrolyzed in a trough.

The furnace according to the invention is particularly important for the recycling of rhodium, platinum, palladium, gold, and iridium.

Conveyance of the liquids during the pyrolysis distributes the carbonization gas generation evenly across the duration of the pyrolysis process. The carbonization gas generated during the pyrolysis reduces natural gas consumption of the thermal post-combustion. Therefore, the thermal post-combustion can, on the one hand, be designed for lower volume fluxes and, on the other hand, requires lower energy consumption due to the continuous supply of carbonization gas.

Preferably, the following measures that can be used individually or in combination with each other are undertaken in the method according to the invention:

A. The method is advantageously carried out in a chamber furnace.
B. Advantageously, two chambers for batch operation are present: one can be used to carry out the pyrolysis followed by the combustion, while the subsequent pyrolysis proceeds in the second chamber already. When the second chamber is then switched to combustion, the first chamber can already be supplied with material for the pyrolysis.
C. It can have very advantageous effects to supply the material for the pyrolysis step both slowly and continuously. Occasional delays of boiling (detonations) that can occur upon batch-wise addition can thus be avoided. The release of energy is more even.
D. Naturally, the pyrolysis step proceeds under the virtual exclusion of oxygen. It is suitable to purge the respective chamber with protective furnace gas, preferably nitrogen, prior to pyrolysis.
E. Usually, the temperature is controlled to a level of 100 to 1200° C., preferably 200 to 800° C., in step A, and a level of 500 to 1200° C., preferably from 600 to 800° C., in step B.
F. Liquid material is preferably supplied for pyrolysis step A both slowly and continuously rather than batch-wise.
G. In step B, precious metal fractions and ash are usefully received in capture troughs, which are arranged underneath the combustion goods supply and/or pyrolysis goods supply.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1 is a schematic diagram of the two chambers according to an embodiment of the invention.

DETAILED DESCRIPTION OF THE INVENTION

A suitable embodiment of a device of the invention is shown schematically in FIG. 1, which illustrates two combustion chambers with heating facility; capture troughs for the reception of precious metal fractions and ash, which are arranged underneath the combustion goods supply and/or pyrolysis goods supply. For carrying out the method according to the invention, two heatable combustion chambers 1, at least one combustion/pyrolysis goods supply 3 each, and at least one capture trough 2 each, arranged underneath the combustion/pyrolysis goods supply, are provided.

The invention will now be described with reference to the following specific, non-limiting, possible examples.

Example 1

Five-hundred kg of different types of waste containing: precious metal fraction from 1 to 20 wt-%, with the elements Rh accounting for 0.001 to 50 wt-%, preferably 0.1 to 20 wt-%, Pd accounting for 0.01 to 50 wt-%, preferably 0.1 to 20 wt-%, and organic fractions/solvent accounting for 50 to 99.99 wt-%, preferably 80 to 99 wt-% of the precious metal fraction, are treated for 8 to 15 hours in a chamber furnace at an oxygen content of <4% and a temperature of 200 to 800° C.

Subsequently, the residue is burned-off while air is being supplied at an oxygen content of 14 to 16% and a temperature of 600 to 800° C.

Example 2

A chamber furnace is supplied with approx. 1100 kg of different types of precious metal-containing waste. For this purpose, 32 troughs with a filling volume of 60 liters each are introduced into the furnace. Fourteen of the troughs are filled with 30 kg each of a coal comprising 0.1 wt-% palladium. Five troughs are filled with 20 kg platinum oxide each, whereby the platinum oxide accounts for 80 wt-% and is contaminated by 20 wt-% of a xylene-based solvent. Five troughs are filled with 20 kg each of a paste from ceramic paint production, whereby the paste comprises approx. 10 wt-% gold. Eight empty troughs are placed in the uppermost level of the furnace. The troughs are supported in a batch rack. Then the furnace is switched to pyrolysis operation. For this purpose, protective furnace gas is introduced into the furnace until the oxygen content drops below 4 wt-%. The furnace, loaded at 200° C., is then heated to 600° C. over the course of 4 hours. The furnace is then kept at 600° C. for two hours.

At this point in time, the pyrolysis in the loaded troughs is all but complete. Then, 500 liters organic liquid from a homogeneous catalyst based on rhodium in triphenylphosphine with added methylisobutylketone is dosed into the empty troughs. The rhodium content is 10 ppm (0.001 wt-%). The solution is continuously pumped into the 8 troughs, such that it becomes distributed as evenly as possible. The pumping output is maximally 200 l/hour and is regulated by the rate of utilization of the thermal post-combustion. For this purpose, the thermal post-combustion is provided with a temperature sensor, which reduces the pumping output if the temperature rises above 1100° C. Consequently, the end of the pyrolysis is reached no earlier than after 2½ hours, or accordingly later for higher calorific values according to the regulation by the thermal post-combustion. After the end of pumping, the temperature of the furnace is increased to 800° C. within approximately 30 minutes.

In the process, the over-pressure of 5 mbar established by the protective furnace gas increases for a short period of time due to the proceeding pyrolysis. Once the over-pressure, detected with a pressure sensor, returns to the over-pressure of the nitrogen purge, this status is maintained for 20 minutes at 800° C. If no further pressure increase occurs within this time of monitoring, atmospheric air is supplied to the furnace chamber, and the oxidation phase is thus started without cooling of the chamber. A second furnace, connected to the same thermal post-combustion as the furnace that has meanwhile been transferred to the combustion phase, is then released for the start of a pyrolysis. The thermal post-combustion is set to 1100° C. and is utilized more efficiently by the combined operation.

The combined operation effects a more even release of carbonization gas quantities across the processes, A and B. By its nature, the thermal post-combustion is designed for one furnace and is actually operated with two furnaces. This saves, for one, resources with respect to dimensioning and, in particular, the energy costs from keeping the temperature at 1,100° C. The natural gas consumption of the thermal post-combustion is reduced further by the introduction of the carbonization gases. This proceeds the more efficiently, the more homogeneous the carbonization gas is introduced, which, according to the invention, is achieved by coupling the post-combustion of one furnace in process B with a furnace that is being operated in process A.

According to the invention, the cooling of the furnace upon the switch from pyrolysis to combustion is saved, and thus, on the one hand, time is saved and, on the other hand, energy for re-heating the furnace is also saved. Moreover, the natural gas consumption for post-combustion in the carbonization gas-free time of cooling is also saved.

The oxidation is then completed in known fashion, upon which the furnace is cooled to 200° C., and the batch is removed.

Using the method according to the invention, various batches can be prepared without mutual mixing. For example, batches from various customers can be processed in parallel, whereby the batches can differ in nature.

The supply of liquids is also advantageous in that the carbonization gas quantity is made more even in order to save costs in the thermal post-combustion. The liquids supplied at 600° C. can also be liquefied pastes or suspensions. In the presence of oxygen, these liquids are potentially explosive especially at these high temperatures. The explosion hazard is excluded according to the invention by keeping the oxygen content below 6 wt-%. Thus, potentially explosive substances are surprisingly being supplied to a furnace at high temperatures.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A recycling furnace for processing potentially explosive precious metal-containing materials having organic fractions that combust with great energy, the furnace comprising:
   at least two combustion chambers, each of the at least two combustion chambers being provided with indirect heating, a protective furnace gas supply and an air or oxygen gas supply and being attached to a single waste gas treatment facility,
   a switching facility for alternating operation of the at least two combustion chambers between (A) pyrolysis or carbonization in an atmosphere comprising maximally 6 weight-% oxygen with gas from the protective furnace gas supply and (B) oxidative combustion of the organic fractions including carbon with oxygen from the air or oxygen gas supply, and
   a sensor for determining an end of the pyrolysis or carbonization in one of the at least two combustion chambers, wherein the sensor controls the switching facility to supply the air or oxygen to an interior of the one of the at least two combustion chambers in which the pyrolysis or carbonization is ending.

2. The recycling furnace according to claim 1, wherein the sensor is a pressure sensor or a substance-sensitive sensor.

3. The recycling furnace according to claim 1, wherein each of the at least two combustion chambers comprises an explosion-proof liquid supply facility feeding a hot chamber at a temperature of at least 400° C.

4. The recycling furnace according to claim 1, further comprising capture troughs, arranged underneath a combustion goods supply or a pyrolysis goods supply, for receiving precious metal fractions and ash.

5. The recycling furnace according to claim 1, further comprising a continuous conveyer facility for dosing liquids or pastes into the one of the at least two combustion chambers during pyrolysis.

6. The recycling furnace according to claim 5, further comprising a temperature sensor for controlling the dosing of liquids and pastes.

7. The recycling furnace according to claim 1, further comprising at least one combustion goods supply for each of the at least two combustion chambers and at least one capture trough for each of the at least two combustion chambers, the at least one capture trough being arranged underneath the at least one combustion goods supply.

* * * * *